(12) United States Patent  
Matsuoka et al.

(10) Patent No.: US 9,274,549 B1  
(45) Date of Patent: Mar. 1, 2016

(54) LOST CORE ELECTRONIC ENCLOSURES

(71) Applicant: GOOGLE INC., Mountain View, CA (US)

(72) Inventors: Yoshimichi Matsuoka, San Jose, CA (US); Michael James Louris, San Jose, CA (US)

(73) Assignee: Google Inc., Mountain View, CA (US)

(*) Notice: Subject to any disclaimer, the term of this patent is extended or adjusted under 35 U.S.C. 154(b) by 173 days.

(21) Appl. No.: 13/930,774

(22) Filed: Jun. 28, 2013

(51) Int. Cl.
*G06F 1/16* (2006.01)
*H05K 5/00* (2006.01)
*H05K 7/00* (2006.01)
*G02F 1/1333* (2006.01)

(52) U.S. Cl.
CPC .............. *G06F 1/16* (2013.01); *G06F 1/1613* (2013.01); *G06F 1/1628* (2013.01); *G06F 1/1633* (2013.01)

(58) Field of Classification Search
CPC . G06F 1/1628; G06F 16/1633; G06F 1/1637; G06F 1/1656; G06F 1/1601; G06F 1/1609; G02F 1/133308; G02F 2001/133311; G02F 2001/133314; H02G 3/08
USPC ............. 361/679.01, 679.02, 679.21, 679.26, 361/679.3, 679.55, 679.56, 728, 730, 731, 361/736, 748, 752, 796; 174/50, 50.5, 174/50.51, 53, 55, 56; 349/58, 60
See application file for complete search history.

(56) References Cited

U.S. PATENT DOCUMENTS

| | | | |
|---|---|---|---|
| 5,583,681 A * | 12/1996 | Shioya et al. ................ 349/60 |
| 5,586,002 A * | 12/1996 | Notarianni .............. 361/679.26 |
| 6,516,866 B1 | 2/2003 | Jones |
| 6,532,152 B1 * | 3/2003 | White et al. ................ 361/692 |
| 6,700,773 B1 * | 3/2004 | Adriaansen et al. ..... 361/679.08 |
| 8,002,533 B2 | 8/2011 | Schittelkop |
| 2007/0080446 A1 * | 4/2007 | Maloney ..................... 257/704 |
| 2009/0080153 A1 * | 3/2009 | Richardson et al. ..... 361/679.56 |
| 2014/0053392 A1 * | 2/2014 | Rothkopf et al. .............. 29/593 |

\* cited by examiner

*Primary Examiner* — Hoa C Nguyen  
*Assistant Examiner* — Binh Tran  
(74) *Attorney, Agent, or Firm* — Brake Hughes Bellermann LLP

(57) ABSTRACT

An electronic product includes an electronic enclosure having a housing pocket fabricated as a seamless single unitary molded structure. The single unitary molded structure defines a cavity therein and has at least one molded undercut feature extending over a portion of the cavity. The housing pocket includes a side opening that is sufficiently large to allow lateral insertion of the electronic assembly into position in the cavity with at least a portion of the electronic assembly extending underneath the at least one molded undercut feature.

24 Claims, 13 Drawing Sheets

300

410
Preparing a core molding or die cast that is in a shape of a hollow or cavity specified for an electronic enclosure for the electronic assembly or sub-assembly, the hollow or cavity having an undercut structural feature extending laterally inward.

420
Placing the core molding in an injection mold where the core defines an internal geometry or shape (i.e., a hollow or cavity) of the electronic enclosure and the injection mold itself defines an external geometry or shape of the electronic enclosure

430
Injecting plastic material specified for the electronic enclosure into the injection mold to form the electronic enclosure

440
Opening the injection mold to remove the formed electronic enclosure having an undercut structural feature.

450
Removing the core molding materials
460
Melting the core molding materials (e.g., in hot bath) and draining the molten core molding materials through as side opening in the formed electronic enclosure

470
Sliding an electronic component underneath the undercut feature through a side opening into the electronic enclosure pocket

480
Covering or sealing the side opening to close the electronic component pocket in the electronic enclosure

400
FIG. 4A

LOST CORE ELECTRONIC ENCLOSURES

TECHNICAL FIELD

This description relates to enclosures, boxes, and cases that are used in of consumer electronic devices to house electrical or electronic components.

BACKGROUND

Hollow enclosures ("electronic enclosures") are commonly used to house electrical or electronic components and circuits ("electronic assemblies") of a variety of electronic products and instruments. The electronic enclosures serve to provide structural support to hold the electronic assemblies in place and also to protect or isolate the electronic assemblies from external environmental hazards (e.g., dust). The variety of electronic products and instruments using such electronic enclosures is diverse (e.g., consumer electronics, game consoles, handheld and desktop computers, industrial PC's, keyboards, computer input devices, pushbuttons, cell phones, smartphones, and charging stations, etc.).

An enclosure for an electronic instrument or product is an integral part of its design, playing a key role in its looks, presentation, value and quality perception. Electronic enclosures are generally rectangular in shape and are designed to house a specific electronic product or instrument (e.g., remote controls, cash register or calculator, etc.). The electronic enclosures are often made by fitting or joining together, for example, several shaped parts or sub-parts. For example, an electronic enclosure for a common computer keyboard includes a shaped top panel fitted on to a shaped semi-hollowed bottom panel. The two panels, which may be glued, screwed or fastened together, are shaped to form a hollow space or cavity to hold keyboard switches and circuits. The top panel may include cutouts for securely mounting and surrounding "keys" or pushbuttons. In the case of an electronic enclosure made of plastic, the shaped parts or sub-parts of the enclosure are commonly made by plastic injection processes using mold core/cavity splits.

A requirement of the plastic injection processes used to make the shaped parts is that the mold cores should eject freely from the injected plastic parts. This requirement prevents ledges, overhangs, or undercuts from being designed on the shaped parts or sub-parts that are used to assemble an electronic enclosure (e.g., a box-like enclosure). Thus, several parts (e.g., at least a top panel and a bottom panel) have to be used to assemble an electronic enclosure whose overall structure includes an undercut cavity. As a result of using several parts, unavoidable parting lines are formed where different parts are fitted or joined together in the enclosure assembly. Further, assembling electronic enclosures from several parts can be an expensive proposition.

Consideration is now being given to ways of making electronic enclosures.

SUMMARY

The term an "undercut" feature is used herein with reference to injection molding processes. In molding, the term refers to a structural or shape feature that cannot be molded using only a single pull mold. Undercuts on molded parts, which may be internal or external, are features that prevent the part from being directly ejected from an injection molding machine. Undercuts on molded parts may still be molded for some geometries, but require a complicating side action or side pull when demolded.

An electronic product or instrument includes electrical or electronic components and circuits. The electrical or electronic components and circuits may be referred to herein, for convenience, as "an electronic assembly". An electronic assembly of an electronic product or instrument may, for example, include one or more of electrical or electronic circuits, integrated circuits, devices, processors, ASICs, memory, circuit boards, electronic or electromechanical switches, and backlights, and power supplies, etc.

In a general aspect, an electronic product includes an electronic enclosure having a housing pocket fabricated as a seamless single unitary molded structure. The single unitary molded structure defines a cavity within the structure and has at least one molded undercut feature extending over a portion of the cavity. An electronic assembly is positioned in the cavity with at least a portion of the electronic assembly extending laterally underneath the at least one molded undercut feature. The housing pocket includes a side opening that is sufficiently large to allow lateral insertion of the electronic assembly into position in the cavity with at least a portion of the electronic assembly extending underneath the at least one molded undercut feature.

In a general aspect, a computer keyboard is formed of a seamless single unitary molded structure defining a substantially closed cavity in the computer keyboard The seamless single unitary molded structure has at least one molded undercut feature extending over a portion of the cavity. An electronic assembly is disposed in the substantially closed cavity of the single unitary molded structure underneath the at least one molded undercut feature.

In a general aspect, a laptop computer enclosure includes at least a pocket having a seamless single unitary molded structure. The seamless single unitary molded structure defines a substantially closed cavity and has at least one molded undercut feature extending over a portion of the cavity. An opening in a rear wall of the pocket, has dimensions that are sufficiently large to allow lateral insertion of a laptop computer electronic assembly through the opening into position in the cavity with at least a portion of the laptop computer electronic assembly extending underneath the at least one molded undercut feature The details of one or more implementations are set forth in the accompanying drawings and the description below. Other features will be apparent from the description and drawings, and from the claims.

BRIEF DESCRIPTION OF THE DRAWINGS

FIGS. 3A and 3B show the electronic enclosure in cross-section and perspective views, respectively.

FIG. 4A is a flow chart illustrating an example method for fabricating an electronic enclosure with a pocket to house an electronic assembly of an electronic product or instrument, in accordance with the principles of the disclosure herein.

Like reference symbols in the various drawings indicate like elements.

DETAILED DESCRIPTION

In accordance with the principle of the disclosure herein, electronic enclosures that are used to house electrical or electronic circuits and components ("electronic assemblies") of a variety of electronic products and instruments are made as seamless single unitary molded structures, for example, using a lost core injection molding process.

FIGS. 1A-1D show examples electronic products and instruments in which electronic enclosures are used to house the electronic assemblies. FIGS. 2, 3A-3B, 5A-5C and 6 show example molded electronic enclosures 200, 300, 500 and 600, respectively, that are molded as seamless single unitary structures using lost core injection molding processes, in accordance with the principle of the disclosure herein.

Figure 1A:
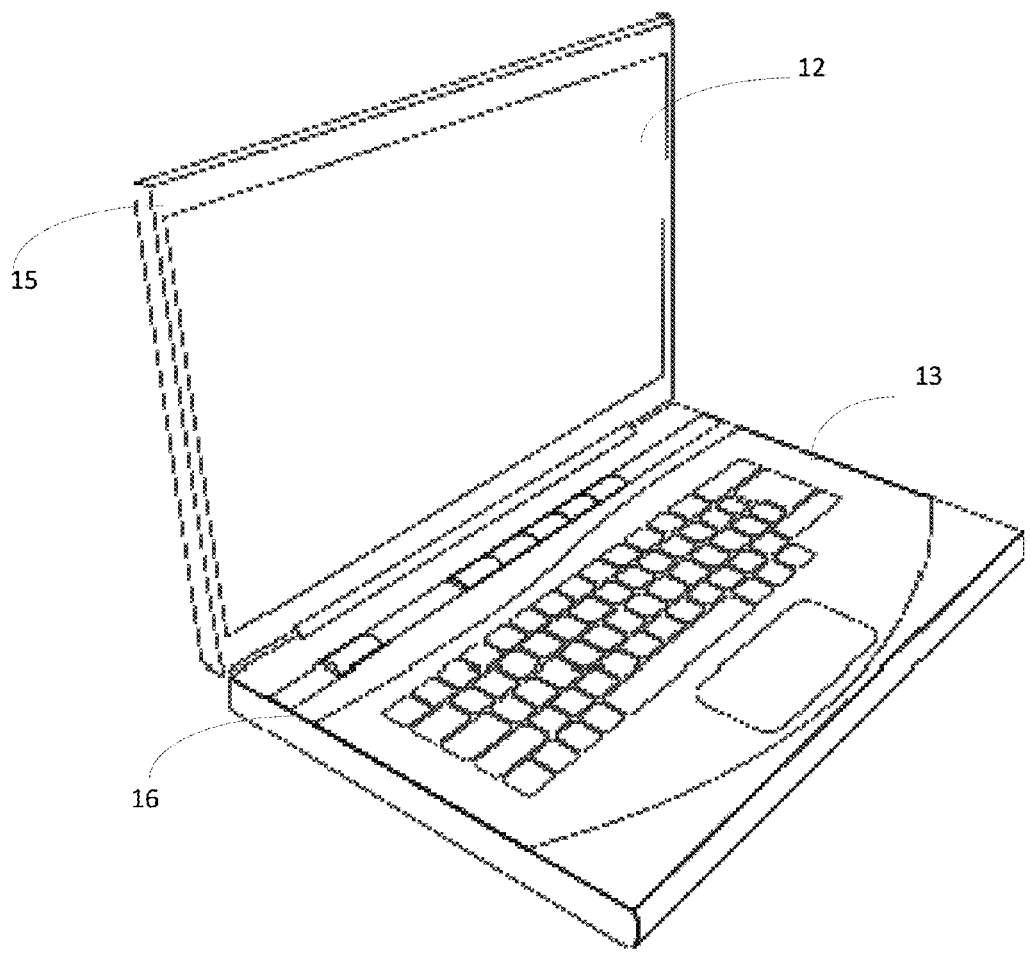
FIG. 1A is schematic illustration of a portable computer (e.g., a laptop computer) with a keyboard.

FIG. 1A shows an example laptop computer 11. Laptop computer 11 includes a display 12 and a touch-activated input device (e.g., keyboard 13) through which a user can interact with the computer. The user may, for example, use keyboard 13 to enter commands, instructions, or text for operating laptop computer 11 or applications thereon (e.g., e-mail, word processing, internet browsing applications, etc.). A user may use laptop computer 11 as a portable device. It will be noted that in laptop computer 11, display 12 may, for example, be housed in an electronic enclosure 15, and keyboard 13 may, for example, be housed in an electronic enclosure 16.

Figure 1B:
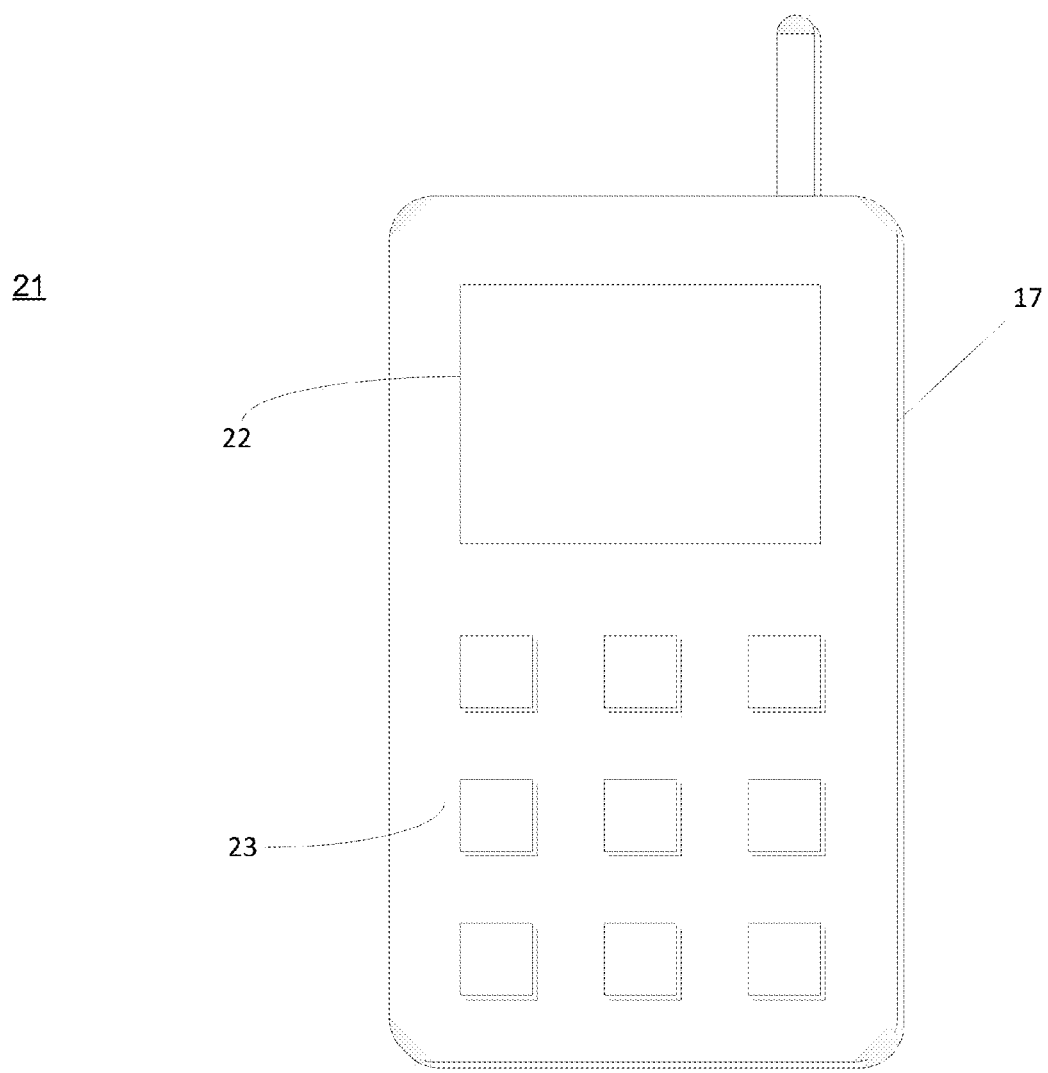
FIG. 1B is schematic illustration of an electronic device (e.g., a mobile phone) with a keypad.

FIG. 1B shows an example consumer electronic device 21. Electronic device 21 may, for example, be a mobile phone built on a mobile computing platform, with computing ability and internet connectivity. Electronic device 21 may include a display 22 and a touch-activated input device (e.g., keypad 23) through which a user can interact with the electronic device 21. The user may use keypad 23, for example, to enter commands, instructions, or text for operating electronic device 21 or applications thereon (e.g., e-mail, texting, internet browser applications, etc.). A user may use electronic device 21 as a portable device. It will be noted that electronic device 21 including display 22 and keypad 23 may, for example, be housed in an electronic enclosure 17.

Figure 1C:
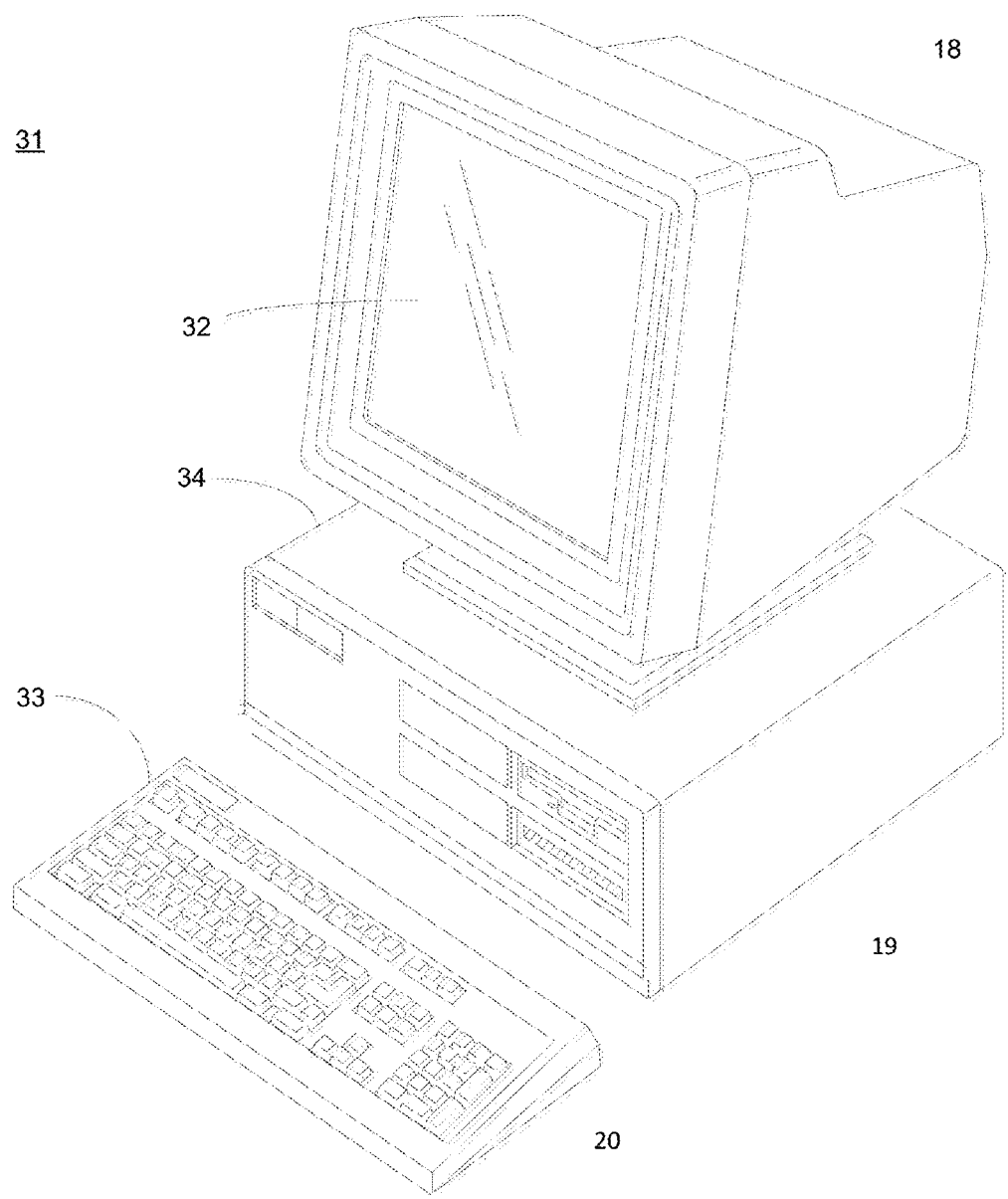
FIG. 1C is schematic illustration of a personal computer system (e.g., a desktop computer) with a keyboard.

FIG. 1C shows an example desktop computer system 31. Computer system 31 may, for example, include a table top display 32, a personal computer 34 (e.g., a desktop computer) and a touch-activated input device (e.g., keyboard 33) through which a user can interact with computer system 31. A user may use keyboard 33 to interact with computer system 31. The user may, for example, use keyboard 33 to enter commands, instructions, or text for operating computer system 31 or applications thereon (e.g., e-mail, word processing, internet browser applications, etc.). Keyboard 33, which may be movable, may be wire or wirelessly linked to computer system 31. It will be noted that table top display 32, personal computer 34 and keyboard 33 may, for example, be housed in respective electronic enclosures 18, 19 and 20.

Figure 1D:
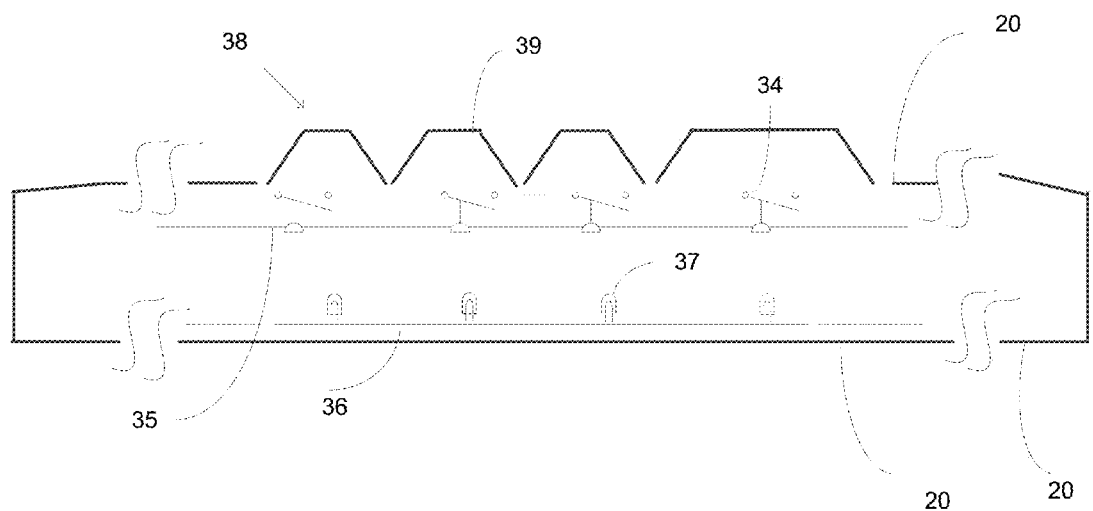
FIG. 1D is a schematic illustration of a lighted or illuminated keyboard. The figure shows a portion of the lighted or illuminated keyboard in cross sectional view.

FIG. 1D shows a cross sectional view of a portion of keyboard 33 illustrating electrical or electronic sub-assemblies that are housed in enclosure 20. Keyboard 33, which may be an illuminated keyboard, may, for example, include a front layer 38 of user-operable keys 39. User-operable keys 39, which may be based on electromechanical switch mechanisms 34, may be touch-operable (e.g., by pressing) by a user. Electromechanical switch mechanisms 34 may be supported on a wiring board 35 Keyboard 33 may further include a backlight layer 36. Backlight layer 36 may include an array of light sources (e.g., LEDs 37) that are configured to backlight and illuminate one or more keys 212. Light generated by LEDs 37 in backlight layer 36 may diffuse through geometrical openings or spaces between keys 39 to front layer 38, or in the case where keys 39 are made of translucent materials the light may diffuse through the translucent materials to front layer 38 to illuminate keys 39.

The foregoing electronic enclosures 15-20 may, for example, be conventional electronic enclosures, each of which may be assembled from many shaped or machined parts made of plastic, metal or composite materials.

Lost core molding processes, which are also known in the literature as fusible core injection molding or soluble core injection molding, are plastic injection molding processes that can be used to mold internal cavities or undercuts that are not possible to mold with demoldable cores.

A lost core molding process for making a desired molded part may include the following steps: (1) casting or molding a core; (2) inserting the core into an injection mold where the core will form the internal geometry of the molded part; (3) overmolding the desired molded part by injecting plastic material of the desired molded part into the injection mold; and (4) removing the injection mold and melting out the core.

The first step, casting or molding a core, may involve a molding or die cast in the shape of a cavity specified for the desired molded part. The core may be made from a low melting point material having, for example, a melting point of about 275° F. (135° C.). Suitable materials for the core may include low melting point metal alloys (e.g., tin-bismuth alloys, tin-lead-silver alloys and tin-lead-antimony alloys), a soluble polymer (e.g., a soluble acrylate), salt (e.g., $Na_2CO_3$+ KCL, etc.), or sand.

The second step, inserting the core into an injection mold, may simply involve loading the core and closing injection mold dies.

After the core is loaded and the injection mold dies closed, the third step, overmolding the desired molded part, may simply involve shooting plastic material for the desired molded part into a space formed between the core and the closed injection mold dies. Suitable plastic materials for the desired molded part may, for example, include glass-filled nylons, unfilled nylons, polyphenylene sulfide, glass-filled polyaryletherketone (PAEK), glass-filled polypropylene (PP), rigid thermoplastic urethane, and elastomeric thermoplastic polyurethane.

The fourth step, removing the injection mold and melting out the core, may involve first demolding the desired molded part and core, and then melting the core from the desired molded part. Melting of the core from the desired molded part may be accomplished by immersion in a hot bath, by induction heating, or through a combination of the two. The hot bath (e.g., a tub filled with glycol or a phenol-based liquid) may have a bath temperature, which is slightly higher than that of the core's melting point, but not so high that it damages the molded part. If the core is made from a soluble polymer, then fourth step of melting out the core may simply involve washing out the soluble polymer.

Figure 2:
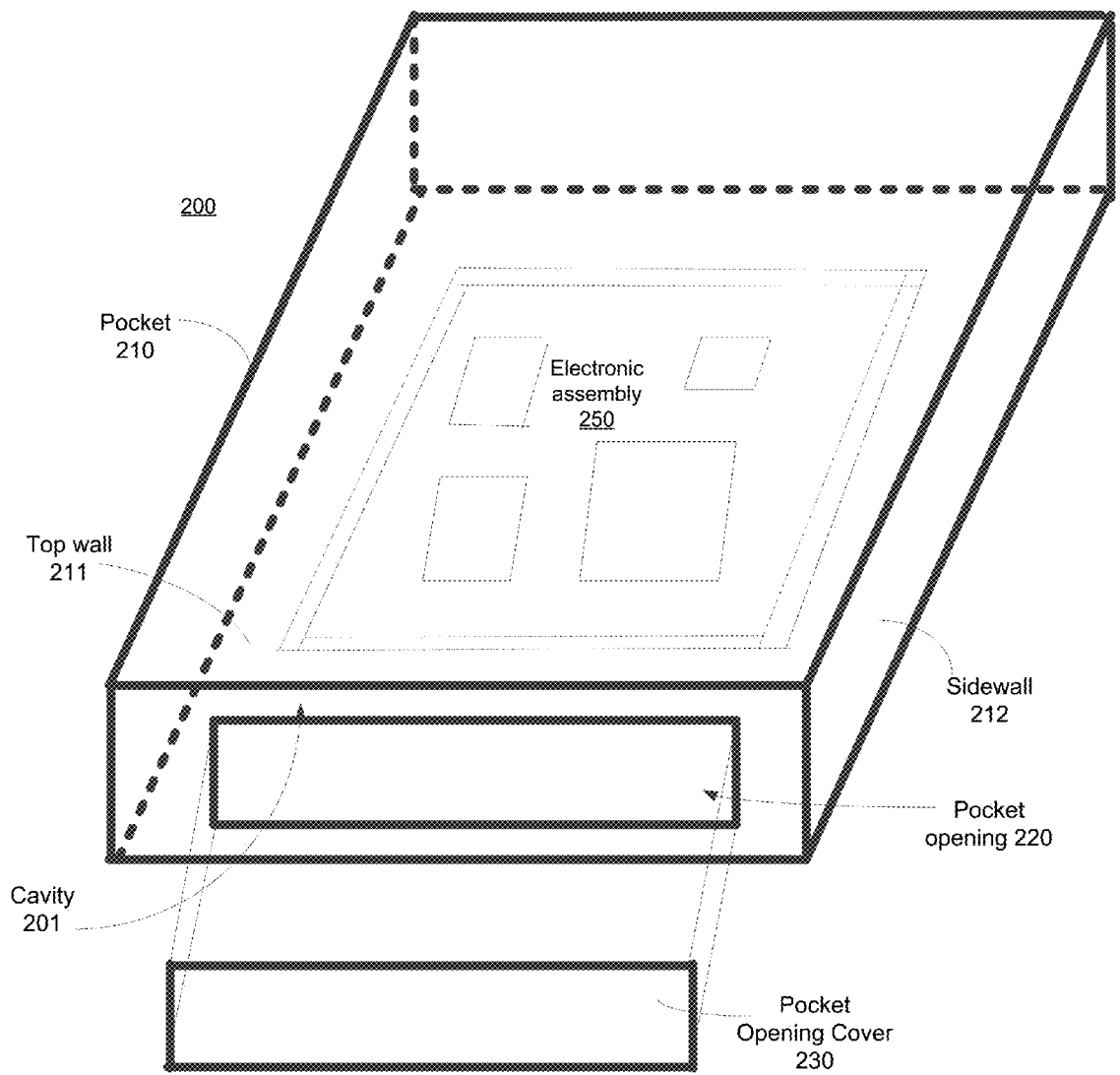
FIG. 2 is schematic illustration of an example electronic enclosure, which is assembled from two molded parts, in accordance with the principles of the disclosure herein.

In contrast to conventional electronic enclosures 15-20 that may be assembled from many shaped or machined parts, FIG. 2 shows an example electronic enclosure 200, which is assembled from fewer (e.g., two) parts. Electronic enclosure 200 may include a molded seamless pocket 210, which may, for example, may be used to house electronic assemblies or sub-assemblies of an electronic product (e.g., a laptop computer, a tablet computer or a computer keyboard, etc.). Electronic enclosure 200 may additionally include one or more covers, which may be used to seal or cover any holes of openings that molded pocket 210 may have.

Pocket 210 may have a hollow or cavity 201 formed therein with at least one undercut structural feature extending laterally inward from one of its sidewalls. In the example shown, the undercut structural feature may be formed by an overhang of top wall 211 of pocket 210 extending inward from sidewalls 212 over cavity 201. Conversely, the pocket may include a "pocket" opening or an "insertion" side opening 220 (e.g., in a side wall), which geometrically provides access to the space underneath the undercut structural feature in cavity 201. Insertion side opening 220 may have dimensions that are sufficiently large so that an electronic assembly or sub-assembly 250 may be inserted in cavity 201 through pocket opening 220 without geometric interference from the undercut structural features of the pocket. Electronic assembly or sub-assembly 250 may be manipulated and placed in the pocket in the space underneath the undercut structural feature through insertion side opening 220. Electronic enclosure 200 may include a seal, plug, cap or cover element (e.g., cover 230) that can be attached to pocket 210 to close or cover insertion side opening 220.

Pocket 210 with its undercut structural feature may be molded as a seamless single unitary article with no seams or parting lines using lost core injection molding processes, in accordance with the principle of the disclosure herein. The fabrication of pocket 210 as a seamless single unitary molded article may be expected to result in electronic enclosure 200 having more structural strength and rigidity compared to that of conventional electronic enclosures that are assembled from many parts. Further, in contrast to the plurality of parting lines or seams present in conventional electronic enclosures that are assembled from many parts, the only parting lines or seams that may be present in a finished electronic product using electronic enclosure 200 may be the parting lines associated with the sealing or covering of insertion side opening 220 of pocket 210 by cover 230. Electronic product enclosures with fewer parting lines may be aesthetically more pleasing to consumers than enclosures with many parting lines or seams.

In accordance with the principle of the disclosure herein, molded electronic enclosure pockets with internal overhangs or undercut structural features may be formed by plastic injection around a cast or molded core (e.g., in step 3 of the lost core process described in the foregoing).

In addition to the insertion side openings, the electronic enclosure pockets of the present disclosure may include other pocket openings that are configured, for example, as ports for utility or service connections (e.g., power connectors, USB connectors, printer connectors, disk drive doors, switches, cables, etc.) to the enclosed electronic product components or to hold a display screen.

Figure 3A:
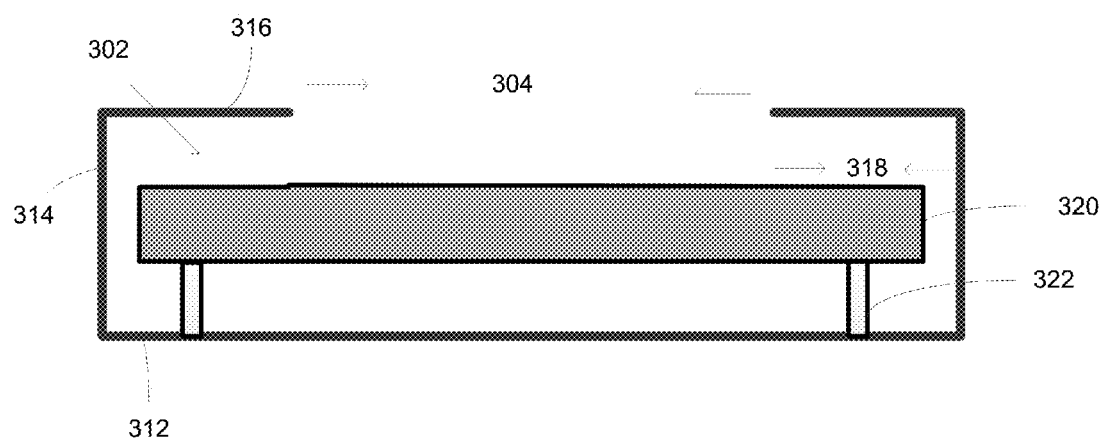
FIGS. 3A and 3B are schematic illustrations of an example electronic enclosure, in accordance with the principles of the disclosure herein.
Figure 3B:
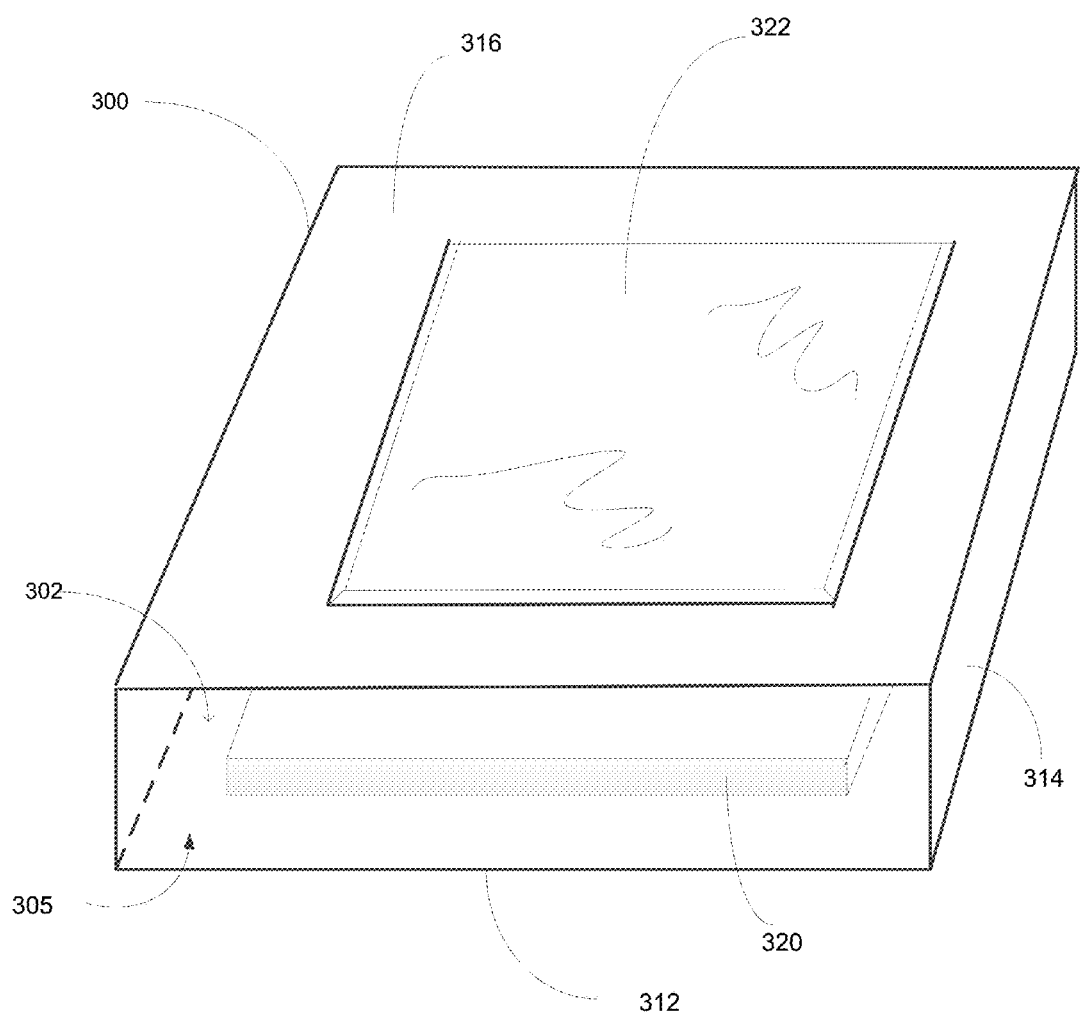

FIGS. 3A and 3B show schematically in cross sectional view and in perspective view, respectively, an example molded electronic enclosure pocket 300, which includes a display screen opening 304 in addition to an insertion side opening 305. FIGS. 3A and 3B show electronic enclosure 300 in cross-section and perspective views, respectively. Electronic enclosure pocket 300 may house an electronic assembly of an electronic product or instrument (e.g., laptop, smart phone, personal digital assistant, etc.). The electronic assembly may, for example, include electronic circuitry, integrated circuitry, processors, application specific integrated circuits (ASICs), memory, circuit boards, etc.

As shown in the figures schematically, electronic enclosure pocket 300 may have a single unitary molded structure enclosing an electronic assembly 320 in a box-like cavity 302. Box-like cavity 302 may be defined in the single unitary molded structure of electronic enclosure pocket 300, for example, by a bottom wall 312, side walls 313 and a top wall 316. Electronic assembly 320 may rest on supports 322 extending from bottom wall 312. Supports 322 may, for example, may be formed as part of electronic enclosure pocket 300 in the course of the plastic injection of the single unitary molded structure. Alternatively, supports 322 may be placed in electronic enclosure pocket 300 as part of the process of installing electronic assembly 320 via side opening 305. Electronic assembly 320 may be fastened in position on supports 322 (or on the floor of cavity 302 (not shown)) using conventional fastening techniques (e.g., clips, screws, adhesives, thermal bonding films, etc.).

As noted earlier, electronic enclosure pocket 300 may include a display screen hole or opening 304, which may be designed to accommodate for example, a display glass 322 of the electronic product or instrument (as shown in FIG. 3B). Electronic enclosure pocket 300 may include other opening or holes (not shown) to accommodate other external interface structures (e.g., switches, push buttons, electrical connectors, power connectors) of the electronic product or instrument. Wiring or cables leading to the enclosed electronic assembly or sub-assembly may pass through these other holes or openings.

Electronic enclosure pocket 300 may be fabricated as a seamless single unitary structure using a lost core molding process, in accordance with the principles of the disclosure herein.

It is noted that unlike conventional electronic enclosures which are made by assembling several parts, no parting lines or seams are present (e.g., between bottom wall 312, side walls 314 and top wall 316) in electronic enclosure pocket 300, which is molded as a single unitary structure. It is further noted that cavity 302 may form undercuts in the structure of electronic enclosure pocket 300. For example, FIG. 3A shows an undercut 318 that is formed by the inward extension of top wall 316 from sidewalls 314 over cavity 302. Other undercuts may be formed by holes (not shown) that may be designed, for example, through side walls 314. Such undercuts in the structure of electronic enclosure 300 would prevent molded part ejection if conventional plastic injection processes were to be used to mold electronic enclosure pocket 300 instead of a lost core molding process.

Figure 4B:
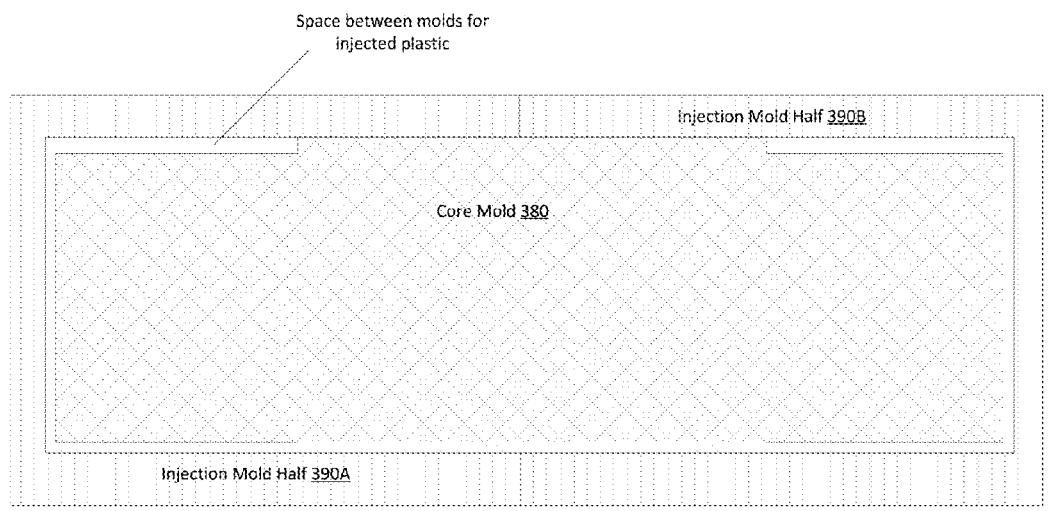
FIG. 4B schematic illustration of example molds that may be used in the method of FIG. 4A to mold the electronic enclosure pocket.

FIG. 4A shows an example method 400 for fabricating an electronic enclosure with a pocket (e.g., pocket 300) to house an electronic assembly of an electronic product or instrument (e.g., laptop, smart phone, keyboard, etc.) using a lost core molding process. The electronic assembly or sub-assembly may, for example, include electronic circuitry, integrated circuitry, processors, specially designed application specific integrated circuits (ASICS), memory, electromechanical switches, backlights, etc. FIG. 4A may be viewed in conjunction with FIG. 4B, which illustrates example molds that may be used in method 300.

Method 400 may include preparing (e.g., casting or molding) a core molding or die cast that is in a shape of a hollow or cavity specified for an electronic enclosure for the electronic assembly or sub-assembly (410). The hollow or cavity may have an undercut structural feature, which may, for example, extend laterally inward from a sidewall or may be an overhang caused by a "ceiling" wall extending over a sidewall. The core molding or die cast may, for example, be made of a low temperature alloy or soluble polymer.

Method 400 further includes placing the core molding (e.g., core mold 380, FIG. 4B) in an injection mold (injection molds 390A and 390B, FIG. 4B) where the core molding defines an internal geometry or shape (i.e., a hollow or cavity) of the electronic enclosure pocket and the injection mold itself defines an external geometry or shape of the electronic enclosure pocket (420), injecting plastic material specified for the electronic enclosure pocket into the injection mold to form the electronic enclosure (430), and opening the injection mold to remove the formed electronic enclosure pocket (e.g., pocket 300) (440). Method 400 includes removing the core molding materials encased in the formed electronic enclosure pocket (450). Removing the core molding materials may involve melting the core molding materials (e.g., in hot bath) and draining the molten through an opening or hole (e.g., the insertion side opening or other opening) in the formed electronic enclosure pocket (460). In the case the core molding is made of a soluble material, removing the core molding may simply involve washing out the soluble material.

Method 400 may further include sliding an electronic component (e.g., electronics assembly 320) underneath the undercut feature through a side opening (e.g., side opening 305) into the electronic enclosure pocket (470), and covering or sealing the side opening with a cover (e.g., cover 230) to close the electronic component pocket in the electronic enclosure (480).

Figure 5A:
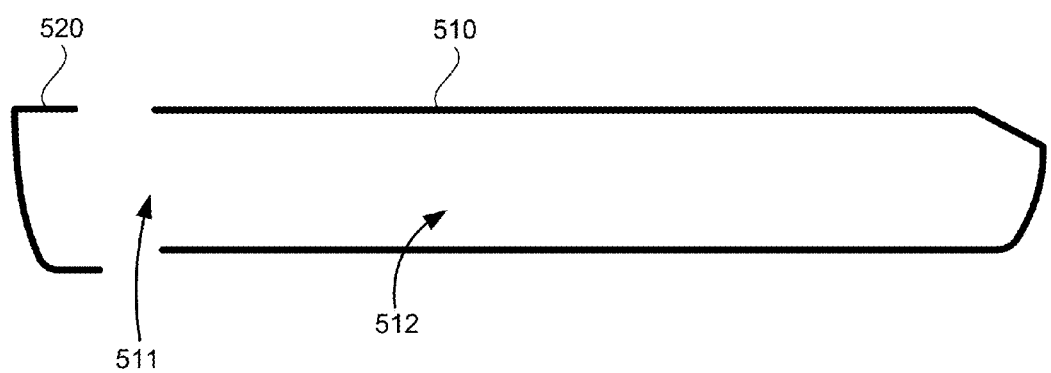
FIGS. 5A-5C are schematic illustrations of another example electronic enclosure, in accordance with the principles of the disclosure herein.
Figure 5B:
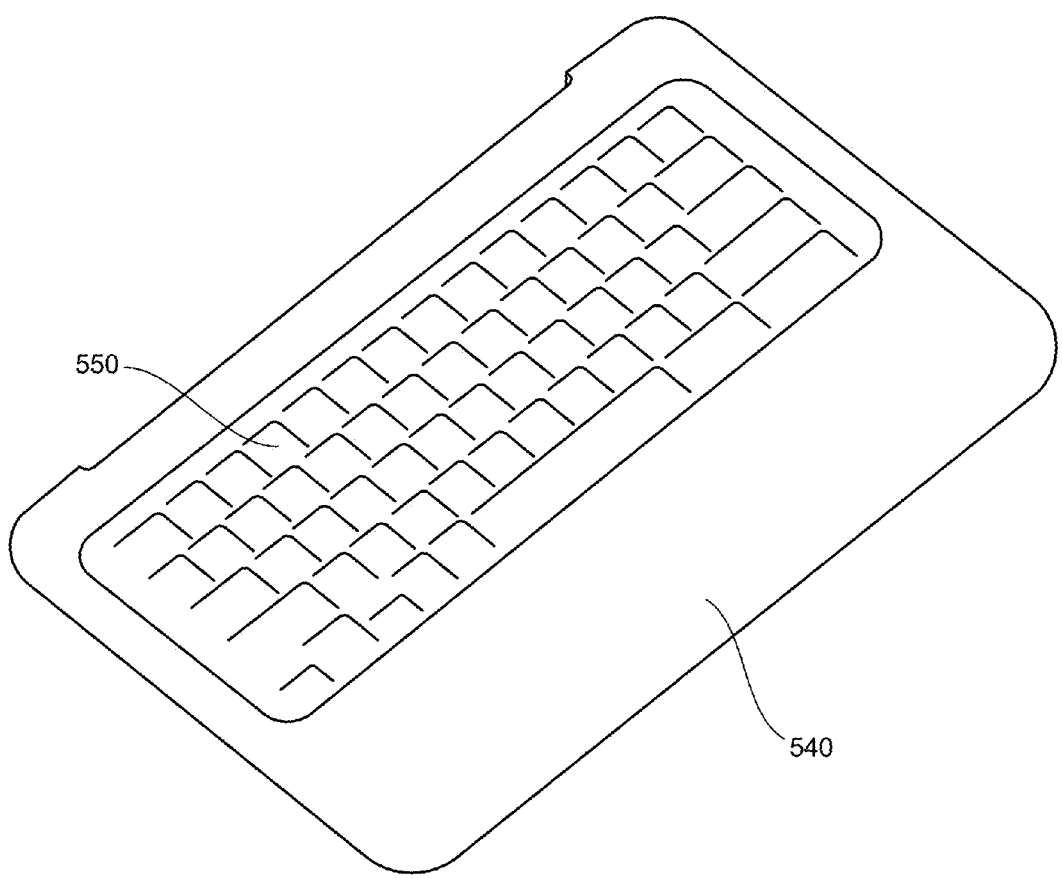
Figure 5C:
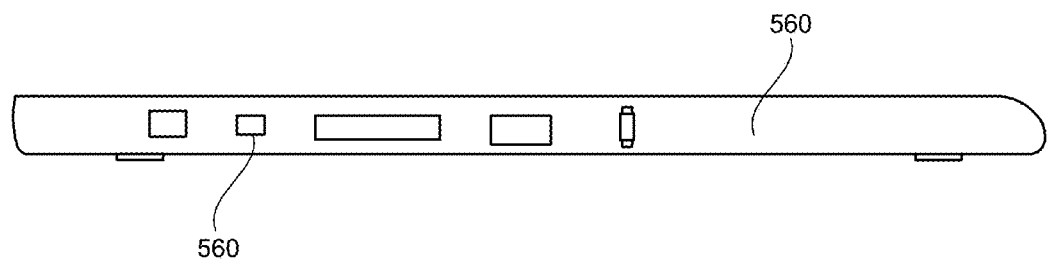

FIGS. 5A-5C show another example electronic enclosure 500, which may be fabricated, for example, using method 400, to house an electronic assembly of an electronic product or instrument. In particular, electronic enclosure 500 may include a seamless pocket 510 to house an electronic assembly of a computer keyboard (e.g., electronic assemblies and sub-assemblies 34-37 of keyboard 33 shown in FIG. 1D). Pocket 510, which may be molded a single unitary structure, may include a back or rear wall opening 511 through which the electronic assembly of the keyboard may be inserted and placed in position in cavity 512. Electronic enclosure 500 may further include a cover 520 to close side opening 511 after electronic assemblies and sub-assemblies 34-37 are placed in position.

FIGS. 5B and 5C show electronic enclosure 500 in perspective and side views, respectively. For convenience, electronic enclosure 500 may be referred to as "keyboard 500" in the following description herein.

Keyboard 500 may have a top surface 540, which is substantially unbroken (i.e. with no holes or a few holes (not shown)). Keyboard 500 on its top surface 540 may include a touch-activated keypad 550 with a layout of keys (e.g., a standard layout of keys) coupled to electromechanical switch mechanisms housed in the cavity of the keyboard. A user may, for example, use touch-activated keypad 550 to enter commands, instructions, or text for operating an electronic device coupled to the computer keyboard. Portions of touch-activated keypad 550 may include translucent materials, which may for example, allow backlight from within the cavity (e.g., light generated by LEDs 37 in backlight layer 36) in electronic enclosure 500 to pass through and illuminate individual keys of touch-activated keypad 550. Keyboard 500 may further include openings or holes 570, for example, in a side wall 560 (FIG. 5B). Openings or holes 570 may, for example, provide access for external interface structures (e.g., communication and power connectors) of the enclosed electronic assembly or sub-assembly of the computer keyboard. Wiring or cables leading to the enclosed electronic assembly or sub-assembly may pass through these holes or openings.

It is noted that unlike conventional electronic enclosures that are made by assembling several parts, no parting lines or seams may be present in keyboard 500 which is molded as a single unitary structure. It is further noted that that in electronic keyboard 500, the cavity housing the electronic assembly of the keyboard forms a complete undercut in the structure of keyboard 500 underneath its unbroken top surface 550. Other undercuts may be formed by holes 570 in side walls 560 (FIG. 5B). Such undercuts would prevent part ejection if conventional plastic injection processes and direct pull molds were to be used to mold the unitary structure of keyboard 500's pocket 510 instead of method 400.

Access to the electronic assemblies of subassemblies housed in the electronic enclosures described herein, for example, for repair, removal or replacement, may be obtained through the same insertion side opening (e.g. side opening 511), through which the electronic assemblies of subassemblies were placed or inserted in the electronic enclosure pockets (e.g. pocket 510). This may involve first removal or disassembly of any side opening cover (e.g. cover 520) that is used to cover or seal the insertion side opening.

Figure 6:
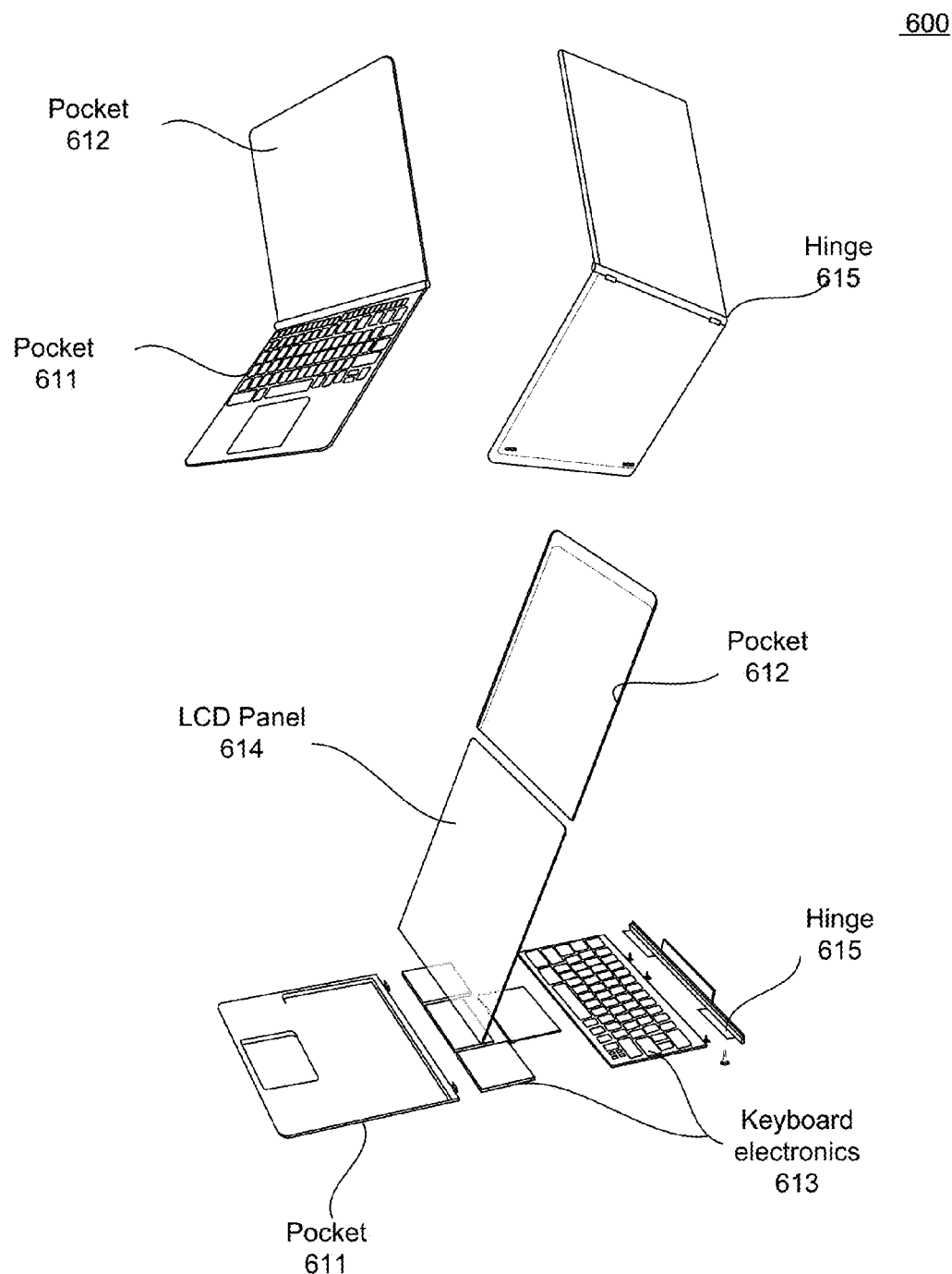
FIG. 6 shows an example laptop computer enclosure 600 in which lost core molded pockets 611 and 612 may house laptop computer electronic assemblies (e.g., keyboard electronics 613 and LCD display panel electronics 614, respectively).

FIG. 6 shows an example laptop computer enclosure 600 in which seamless molded pockets 611 and 612 may house laptop computer electronic assemblies (e.g., keyboard electronics 613 and LCD display panel electronics 614, respectively). The electronic assemblies may be slid in the pockets through respective rear or backside insertion openings (not shown), which are then covered or sealed with covers in a hinge structure 615. Unscrewing the hinge structure 615 may reopen the rear or backside insertion openings so that electronic assemblies can be slid out for repair, removal or replacement.

A limited number of implementations of electronic enclosures molded as seamless single unitary structures have been described herein. Nevertheless, it will be understood that various modifications may be made without departing from the spirit and scope of this disclosure or the following claims.

What is claimed is:

1. An electronic product comprising:
a rigid electronic enclosure having a housing pocket fabricated as a seamless single unitary molded structure, the single unitary molded structure defining a cavity within the structure and having at least one molded undercut feature extending over a portion of the cavity; and
an electronic assembly positioned in the cavity with at least a portion of the electronic assembly extending laterally underneath the at least one molded undercut feature, the electronic assembly including a display glass,
wherein a wall of the housing pocket includes a side opening that is sufficiently large to allow lateral insertion of the electronic assembly into position in the cavity with at least a portion of the electronic assembly extending underneath the at least one molded undercut feature, and
wherein a top portion of the housing includes a display opening, the display opening exposing the display glass.

2. The electronic enclosure of claim 1, wherein the side opening is in a rear wall of the single unitary molded structure.

3. The electronic enclosure of claim 1 further comprising a side opening cover inside the side opening.

4. The electronic enclosure of claim 1, wherein the single unitary molded structure includes one or more of glass-filled nylons, unfilled nylons, polyphenylene sulfide, glass-filled polyaryletherketone (PAEK), glass-filled polypropylene (PP), rigid thermoplastic urethane, and elastomeric thermoplastic polyurethane.

5. The electronic enclosure of claim 1, wherein the single unitary molded structure defining a cavity within the structure and having at least one molded undercut feature extending over a portion of the cavity is fabricated using a lost core molding process.

6. The electronic enclosure of claim 1, wherein the electronic assembly disposed in the cavity includes a circuit board disposed in the cavity.

7. The electronic enclosure of claim 1, wherein the unitary molded structure includes one or more holes or openings in addition to the side opening leading to the cavity through an exterior wall, and wherein the one or more holes or openings are configured as ports for utility or service connections to the electronic assembly.

8. The electronic enclosure of claim 7, wherein at least one of the holes or openings is configured to accommodate an external pushbutton or switch that is electrically connected to the electronic assembly positioned in the cavity.

9. The electronic enclosure of claim 1, wherein a portion of an exterior surface of the unitary molded structure is configured as a touch-activated key pad that is mechanically coupled to an electromechanical or pressure-sensitive switch in the electronic assembly positioned in the cavity.

10. The electronic product of claim 1, wherein the housing pocket has no seams or parting lines.

11. The electronic product of claim 1, wherein:
    the rigid electronic enclosure is made of only two parts, the housing pocket and a cover sealing the side opening,
    the housing pocket includes at least one support extending from a bottom wall under the undercut, and
    the electronic assembly rests on the at least one support.

12. A computer keyboard, comprising:
    a seamless rigid single unitary molded structure defining a substantially closed cavity in the computer keyboard and having at least one molded undercut feature extending over a portion of the cavity, the seamless rigid unitary molded structure being made of a rigid material and including a top wall, opposing side walls adjacent to the top wall, and a bottom wall opposing the top wall and adjacent to the opposing sidewalls, at least one of the sidewalls defining a first opening that is sufficiently large to allow lateral insertion of an electronic assembly into position in the cavity and the top wall defining a second opening sufficiently large to expose a keypad of the electronic assembly; and
    the electronic assembly disposed in the substantially closed cavity of the single unitary molded structure underneath the at least one molded undercut feature, the electronic assembly including the keypad, the keypad including keys extending through the second opening.

13. The computer keyboard of claim 12, wherein the opening in the at least one sidewall is sufficiently large to allow lateral insertion of the electronic assembly into position in the cavity with at least a portion of the electronic assembly extending underneath the at least one molded undercut feature.

14. The computer keyboard of claim 13, wherein the seamless rigid single unitary molded structure defining a substantially closed cavity in the computer keyboard and having at least one molded undercut feature extending over a portion of the cavity is fabricated using a lost core molding process.

15. The computer keyboard of claim 13 further comprising an opening cover attached to the seamless rigid single unitary molded structure.

16. The computer keyboard of claim 12, wherein the electronic assembly disposed in the substantially closed cavity includes a layer of electromechanical switches.

17. The computer keyboard of claim 12, wherein the electronic assembly disposed in the substantially closed cavity includes a backlight layer.

18. The computer keyboard of claim 12, wherein a surface of the seamless rigid single unitary molded structure defining the substantially closed cavity in the computer keyboard is configured as a touch-activated keypad coupled to one or more electromechanical or pressure-sensitive switches disposed in the cavity.

19. The computer keyboard of claim 18, wherein the surface of the seamless rigid single unitary molded structure includes a translucent material that allows light from within the cavity to illuminate the touch-activated keypad.

20. The computer keyboard of claim 12, wherein the seamless rigid single unitary molded structure defining the cavity in the computer keyboard includes one or more of glass-filled nylons, unfilled nylons, polyphenylene sulfide, glass-filled polyaryletherketone (PAEK), glass-filled polypropylene (PP), rigid thermoplastic urethane, and elastomeric thermoplastic polyurethane.

21. The computer keyboard of claim 12, wherein the electronic assembly disposed in the cavity includes an integrated circuit disposed in the cavity.

22. A laptop computer enclosure, comprising:
    at least a pocket having a seamless rigid single unitary molded structure, the seamless rigid single unitary molded structure defining a substantially closed cavity and having at least one molded undercut feature extending over a portion of the cavity;
    a first opening in a rear wall of the pocket, the first opening having dimensions that are sufficiently large to allow lateral insertion of a laptop computer electronic assembly through the first opening into position in the cavity with at least a portion of the laptop computer electronic assembly extending underneath the at least one molded undercut feature;
    an opening cover in the opening in the rear wall of the pocket; and
    a second opening sufficiently large to expose a keypad of the laptop computer electronic assembly.

23. The laptop computer enclosure of claim 22, wherein the seamless rigid single unitary molded structure defining the substantially closed cavity and having at least one molded undercut feature extending over the portion of the cavity is fabricated using a lost core molding process.

24. The laptop computer enclosure of claim 22, wherein the pocket is configured to hold keyboard electronics.

* * * * *